Sept. 17, 1968 R. G. LINDNER 3,401,493
CORRUGATED METAL BUILDING SHEETS HAVING A RIGID PLASTIC
FOAM COATING AND CONNECTIONS THEREFOR
Filed July 13, 1965
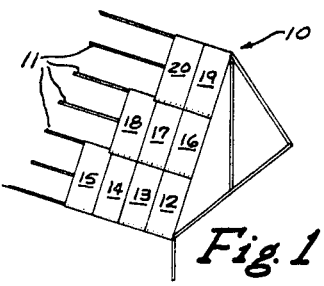
Fig.1
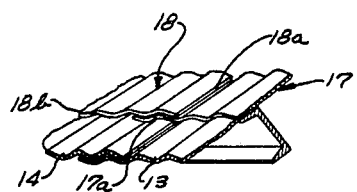
Fig.2
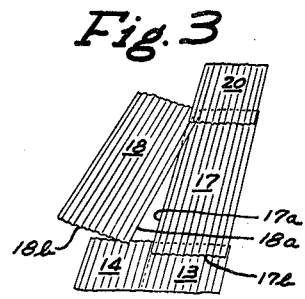
Fig.3
Fig.4
Fig.5
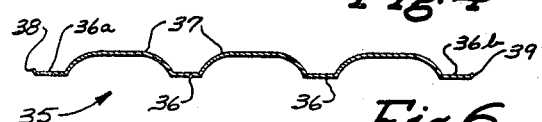
Fig.6
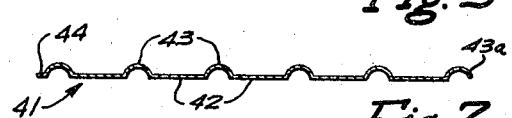
Fig.7
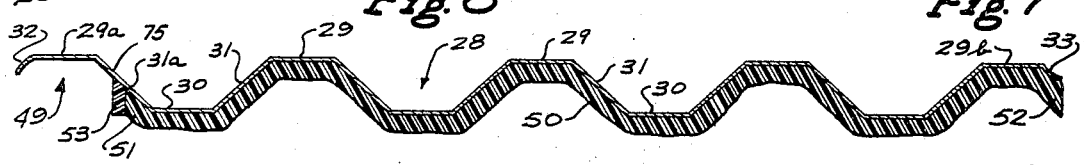
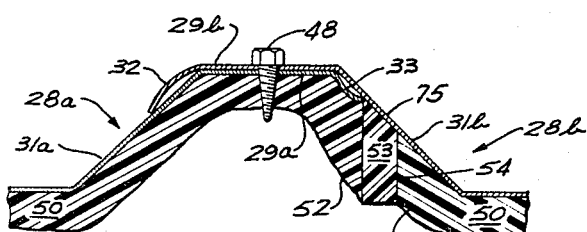
Fig.9
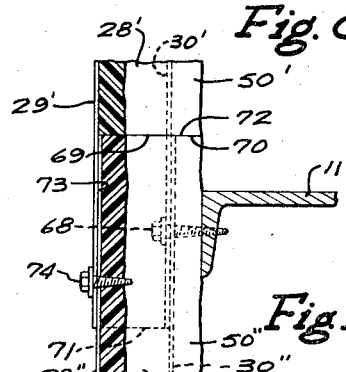
Fig.8
Fig.12
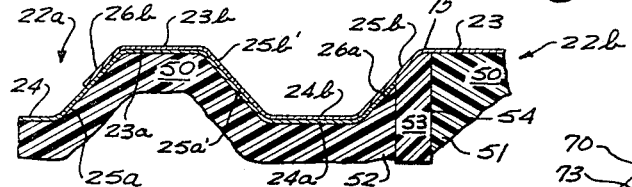
Fig.10
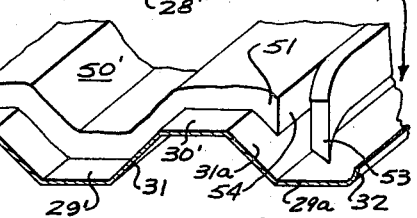
Fig.13
INVENTOR.
ROBERT G. LINDNER
BY
*Harry B. Keck*
ATTORNEY

United States Patent Office 3,401,493
Patented Sept. 17, 1968

3,401,493
CORRUGATED METAL BUILDING SHEETS HAVING A RIGID PLASTIC FOAM COATING AND CONNECTIONS THEREFOR
Robert G. Lindner, Bridgeville, Pa., assignor to H. H. Robertson Company, Pittsburgh, Pa., a corporation of Pennsylvania
Filed July 13, 1965, Ser. No. 471,640
6 Claims. (Cl. 52—309)

ABSTRACT OF THE DISCLOSURE

A corrugated building sheet formed from sheet metal and having overlapping and overlapped margins along first and second side edges of the sheet. A rigid plastic foam coating applied to the entire unexposed surface of the metal sheet except for the overlapping margin and an adjoining lengthwise portion of the unexposed surface. The foam coating has lengthwise beads of increased thickness, one adjacent to the adjoining lengthwise portion and one at the second side edge. A lengthwise strip of flexible foam plastic overlying the adjoining lengthwise portion and positioned along the length of the adjacent lengthwise bead.

---

This invention concerns corrugated metal building sheets having a coating of rigid plastic foam adhered over substantially all of one surface thereof, and sidelap and end-lap joints for two of such building sheets.

Corrugated building sheets are widely used in the construction of roofs and sidewalls of buildings. Such corrugated metal sheets are load carrying sheathing members of the structure and normally are fabricated from essentially rectangular sheets of steel or aluminum or alloys thereof. Corrugated steel sheets normally are provided with a zinc coating for corrosion resistance and, on the exposed weathering surface, are provided with a decorative coating such as paint, enamel, porcelain enamel, plastic films, bituminous compositions. In some instances, as is described in the U.S. Patent 2,073,334, corrugated building sheets are provided with a coating of asbestos fibers and asphaltic saturant which is bonded directly to a molten zinc film on the steel core and in turn covered with a tough, weather-resistant resinous coating. Where aluminum is selected as the core metal for the corrugated building sheets, it is coated with paints, enamels, porcelain enamel, plastic films, anodized colored surfaces, and sometimes with no extrinsic coating at all since aluminum itself is relatively corrosion free.

Corrugated sheet metal building sheets are customarily applied directly to a skeletal framework of a building which includes columns, girders, beams, girts and purlins. Customarily the corrugated building sheets are fastened directly to such skeletal structure by screws which extend through the sheets. Customarily the corrugated sheets are overlapped side-by-side and top-to-bottom. With top-to-bottom overlap, the upper corrugated metal sheet is secured to the skeletal framework of the building with its lower marginal portion overlapping in outbroad relation the upper marginal portion of a previously erected subjacent corrugated metal sheet. With side-by-side connections, one or more of the extreme lateral corrugations of a previously erected corrugated metal sheet is directly overlapped by one or more of the extreme lateral corrugations of the next-to-be-erected corrugated metal sheet. Screws are driven through both of the sheets which form the side-by-side joint, i.e., through the overlapped sheet and through the overlapping sheet.

By applying a coating of foamed-in-place rigid plastic foam to one surface of such corrugated metal building sheets, it is possible to take advantage of the excellent thermal insulating properties of such foamed-in-place rigid plastic materials such as foamed polyurethane. By applying a coating of the foamed-in-place rigid resin to the unexposed surface of such corrugated metal building sheets, a complete building product is realized which has a weather-resistant outer surface and thermal insulating properties in a single building sheet.

The side-by-side and top-to-bottom erection of such rigid plastic foam coated building sheets has presented problems for the reason that the rigid plastic foam coating has a normal thickness which is at least several times greater than the normal thickness of the corrugated metal sheet itself. For example the rigid plastic foam coating may have a thickness of ½ inch whereas the corrugated metal itself has a thickness of ¹⁄₂₀ inch. In that instance, the rigid plastic foam coating has a thickness ten times greater than that of the corrugated metal. The problem of forming joints, top-to-bottom and side-by-side, with such rigid plastic foam coated corrugated metal sheets is the concern of the present invention.

Statement of the invention

According to the present invention, rigid foamed-in-place plastic coatings are applied to corrugated metal building sheets after the corrugated metal building sheet has been fabricated into the profile of its ultimate use. A wide variety of functional and aesthetic profiles for corrugated building sheets is known in the art. According to the present invention, the corrugated metal building sheet is coated with a foamable resinous composition which is allowed to rise freely to a final rigid plastic foam composition. That foamable resinous composition is applied substantially over the entire unexposed surface of the corrugated metal building sheet except for a marginal region which is maintained free of the foamable resinous composition. The foam-free overlapping marginal region is obtained by providing during application of the foamable resinous composition a suitable masking element over those marginal regions of the unexposed surface which are to be kept foam-free. Where the marginal region extends along the lateral corrugation, a lengthwise masking dam may be provided along the entire length of the corrugated metal building sheet while the foamable resinous composition is being applied to the unexposed surface. Where the marginal regions extend across all corrugations of the corrugated metal building sheet, a transverse masking dam may be provided. Where the lengthwise masking dams are provided, a greater quantity of the foamable resinous composition is applied to the corrugated metal building sheet adjacent to the masking dam and also along the side of the corrugated metal building sheet opposite to the dam. As a result of the increased quantity of the foamable resinous composition, the thickness of the resulting rigid plastic foam coating is greater along the length of the two side edges of the insulating coating than the essentially uniform thickness of the coating over the remainder of the corrugated metal building sheet.

According to this invention a strip of flexible foam plastic material preferably having a polygon cross-section is applied lengthwise of the corrugated metal building sheet along the lateral marginal region thereof in engagement with the lateral edge of the insulating coating. The thickness of the flexible foam plastic strip is greater than the essentially uniform thickness of the rigid plastic foam coating. The thickness of the flexible foam plastic strip corresponds with the increased thickness of the rigid plastic foam coating which appears along the two sides of that insulating coating. Preferably the strip of flexible foam plastic material is adhered to the normal side surface of the increased thickness rigid plastic foam coating which defines the lateral marginal region.

When two such corrugated building sheets are assembled in side-by-side relation, the overlapping lateral marginal region of one sheet is applied in surface-to-surface engagement with the extreme lateral edge of the exposed surface of an adjacent one of the building sheets. The strip of flexible foam plastic material is compressed between the thickened edges of the two rigid plastic foam coatings, thereby providing a continuous thermal barrier and a continuous vapor barrier over the unexposed surface of the two assembled corrugated building sheets.

Where end-to-end overlapping connections are desired, an end-marginal-region is maintained free of the foamable resinous composition whereby that end-marginal-region is not coated with a rigid plastic foam coating. That end-marginal-region fits over the top edge of a previously erected corrugated building sheet with the rigid plastic foam of the two sheets being in butting engagement and with the uncoated end-marginal-region of the top building sheet being in surface-to-surface engagement with the exposed surface of the top margin of the previously installed subjacent corrugated metal building sheet.

Objects and advantages

One of the advantages of the present invention is the provision of corrugated metal building sheets which can be assembled in side-by-side and top-to-bottom overlapping engagement.

The flexible foam plastic strip readily accommodates reasonable dimension tolerances in the sheet width deviation from sheet to sheet and also accommodates reasonable dimension tolerances in the width deviation of the rigid plastic foam coating on each sheet.

The added thickness of the flexible foam plastic strip provides essentially uniform thermal conductivity for the resulting building sheets which corresponds to that of the remainder of the rigid plastic foam coating. In general, the coefficient of thermal conductivity for flexible foamed plastic substances is higher than the coefficient of thermal conductivity of rigid plastic foam substances. Accordingly the greater thickness of the flexible foam plastic strip provides, overall, a minimum coefficient of thermal conductivity. The thickened side edges of the rigid plastic foam coating are adapted for the adhesion of the flexible foam plastic strip. These thickened side edges, moreover, minimize any localized thermal wicking resulting from the presence of the flexible foam plastic strip.

These and other advantages of the present invention will become apparent from the following detailed description by reference to the accompanying drawings in which:

FIGURE 1 is a sketch illustrating the sequence of assembly of corrugated metal building sheets applied to a pitched roof of a building;

FIGURE 2 is a fragmentary perspective illustration showing corrugated metal building sheets with both top-to-bottom and side-by-side lapping;

FIGURE 3 is another schematic illustration of corrugated metal building sheets assembled with top-to-bottom and side-by-side joints being illustrated;

FIGURES 4, 5, 6, and 7 are cross-section profile views of typical corrugated metal building sheets which are commercially available today and to which the present invention may be applied;

FIGURE 8 is a cross-section view of the corrugated metal building sheet of FIGURE 5 to which a rigid plastic foam coating and a flexible foam plastic strip have been applied in accordance with the present invention;

FIGURE 9 is a fragmentary cross-section view of the side-by-side joint of two corrugated metal building sheets of the type shown in FIGURE 8;

FIGURE 10 is a fragmentary cross-section view of the side-by-side joint of two corrugated metal building sheets of the type shown in FIGURE 4;

FIGURE 11 is a fragmentary cross-section view of the side-by-side joint of two corrugated metal building sheets of the type shown in FIGURE 6;

FIGURE 12 is a fragmentary cross-section view showing the top-to-bottom joint between two corrugated metal building sheets; and FIGURE 13 is a fragmentary perspective illustration of a corner of a typical corrugated metal building sheet, of the type shown in FIGURE 5 having a side marginal region, an end marginal region and having a flexible foam strip partially separated from the rigid plastic foam coating for illustrative purposes.

Referring to FIGURE 1, there is illustrated a typical pitched roof construction for a building 10 having horizontal purlins 11 forming a sloping skeletal framework. Individual corrugated metal building sheets 12-to-20 inclusive are secured to the individual purlins 11. It will be observed that each of the corrugated metal building sheets 12-to-20 extends over at least three of the purlins 11. The sheets 12, 13, 14, 15 are connected to each other through side-by-side joints. The sheets 12, 16, 19 are connected to each other by top-to-bottom joints.

The sheet 13 is erected after and overlaps the sheet 12.
The sheet 14 is erected after and overlaps the sheet 13.
The sheet 15 is erected after and overlaps the sheet 14.
The sheet 16 is erected after and overlaps the sheet 12.
The sheet 17 is erected after and overlaps the sheet 13.
The sheet 18 is erected after and overlaps the sheet 14.
As shown in FIGURE 1 the next-to-be-erected sheet in the roof assembly will overlap in side-by-side relation the installed sheet 15.

Referring to FIGURES 2 and 3, certain of the corrugated metal building sheets of FIGURE 1 are reproduced to illustrate the overlapping side-by-side joints and top-to-bottom joints. The corrugated building sheet 18 has an overlapping side margin 18a which has its unexposed surface in surface-to-surface engagement with the outer surface of the overlapped side margin 17a the corrugated building sheet 17 whereby those two building sheets 17, 18 are overlapped side-by-side. Similarly the overlapping side margin of the corrugated building sheet 14 is in surface-to-surface engagement with the overlapped side margin of the corrugated building sheet 13 whereby those two building sheets 13, 14 are overlapped side-by-side. Both corrugated sheets 17, 18 have end marginal regions 17b, 18b which overlap the top end margins of the corrugated building sheets 13, 14 respectively in top-to-bottom overlapping relation.

In addition to the curvilinear corrugation profile of the building sheets shown in FIGURES 2 and 3, other commercially available corrugated building sheets have profiles shown in FIGURES 4, 5, 6, 7. All of these corrugated metal building sheets are formed from an essentially rectangular sheet of metal and have generally parallel grooves or troughs forming the corrugations. The sheets have spaced surfaces aligned in a common plane to admit fastening of each building sheet to a flat surface.

As shown in FIGURE 4 a corrugated metal building sheet 22 has eight crests 23 and eight valleys 24 which are joined by sloping webs 25. Fragmentary sloping ribs 26a, 26b are provided at each side of the building sheet 22. The fragmentary sloping web 26a declines from the lateral crest 23a whereas the fragmentary sloping web 26b rises from the lateral valley 24b. Overlapping of such building sheets is shown in FIGURE 10 as including surface-to-surface engagement of a crest and valley from each building sheet, one of the sloping webs 25 from each building sheet, and two fragmentary sloping webs 26a, 26b.

Another available corrugated building sheet profile 28 is shown in FIGURE 5 as including five crests 29 and four intervening valleys 30 which are connected by generally sloping webs 31. A fragmentary terminal rib 32 is provided adjacent to the lateral crest along one side of the building sheet 28 and a differing lateral fragmentary rib 33 is provided along the other side of the building sheet adjacent to the lateral crest. Preferably these fragmentary ribs 32, 33 are rolled in the manner described in U.S. Patent 3,150,465.

Another available corrugated building sheet profile 35 is shown in FIGURE 6 and includes four generally flat valleys 36 with three intervening convex trough surfaces 37. The convex trough surfaces 37 are not completely arcuate, but instead are generally flattened at their mid-region along a plane which is essentially parallel with that of the valleys 36. Thus the mid-region of the concave trough surfaces 37 correspond to crests and the edge regions of the trough surfaces 37 correspond to the sloping webs. Fragmentary terminal webs 38, 39 may be provided. One of the lateral crests 36a will be provided somewhat shorter than the other lateral terminal crest 36b to permit the two lateral crests of adjoining ones of the building sheets 35 to be nested together for overlapping engagement wtih the crest 36a overlapping the crest 36b.

A further commercially available corrugated building sheet profile 41 is illustrated in FIGURE 7 and has a plurality of generally flat valleys 42 and interposed therebetween a plurality of convex troughs 43. The right-hand terminal convex trough 43a is incomplete. A fragmentary terminal valley 44 is provided at the left-hand end of the building sheet 41. The fragmentary convex trough 43a serves as the overlapping corrugation for side-by-side assembly of a pair of corrugated building sheets 41.

Regardless of the metal which is utilized in fabricating the corrugated building sheets of this invention, it is essential that the ultimate profile be formed before the sheets are coated on their unexposed surfaces with foamable plastic resinous compositions.

The corrugated metal building sheet of FIGURE 5 is shown in FIGURE 8 with the rigid plastic foam coating 50 of this invention in place. The foam coating 50 is adhered to the entire unexposed surface of the sheet 28 except for an overlapping margin 49 and an adjoining lengthwise portion 75 of the unexposed surface of the sheet 28. The rigid plastic foam coating 50 has a substantially constant usual thickness over the entire unexposed surface of the building sheet 28 of FIGURE 8. The overlapping marginal region 49 is free of the insulating coating 50 and includes the fragmentary web 32, the lateral crest 29a and a portion of the lateral sloping web 31a. At a predetermined location along the sloping surface of the web 31a, the rigid plastic foam coating 50 terminates in a first lengthwise bead 51 having greater thickness than the generally constant usual thickness of the rigid foam coating 50 elsewhere over the building sheet 28. Similarly a second lengthwise thickened bead 52 is provided on the unexposed surface beneath the terminal fractional sloping web 33.

A strip 53 of polygon cross section (a right-angle trapezoid as shown) is applied to the vertical edge of the rigid plastic foam coating 50 along the thickened edge portion 51 and overlies the adjoining lengthwise portion 75. Preferably the strip of flexible foamed plastic material 53 is provided along the abutting surface 54 with a coating of pressure sensitive adhesive substance to facilitate the adhesion between the two (rigid and flexible) foam materials. It will be observed that the abutting surface 54 corresponds in width to the thickness of the flexible foamed plastic strip 53 and the increased thickness lateral bead 51. The abutting surface 54 is generally normal to the plane of the valleys 30 of the corrugated building sheet 28.

The side-by-side joint of two corrugated metal building sheets according to this invention is shown in FIGURE 9 utilizing the building sheet of FIGURE 8. It will be observed that the fractional sloping web 33 of the left-hand corrugated sheet 28a bears against the uncoated unexposed surface of the sloping web 31b of the right-hand building sheet 28b. Similarly the convex marginal web 32 of the right-hand building sheet 28b, bears against the exposed outer surface of the last sloping web 31a on the left-hand building sheet 28a. The concave configuration of the fractional sloping web 33 and the convex configuration of the marginal web 32 corresponds with that described in the U.S. Patent 3,150,465. It will be observed that the strip 53 of flexible foam plastic is compressed between the terminal beads 51, 52 of the two abutting building sheets. The flexible foam plastic strip 53 has a thickness along the edge 54 which is related to the substantially constant usual thickness of the rigid plastic foam coating 50 in the ratio of the coefficients of thermal conductivity of the two materials. Since the flexible foam plastic strip 53 will have a greater coefficient of thermal conductivity, its thickness is greater than the substantially constant usual thickness of the rigid plastic foam coating 50. The thickness of the flexible foam plastic strip should be related to the substantially constant usual thickness of the rigid plastic foam coating in the ratio of the thermal conductivity of the two materials so that the two materials will have approximately the same thermal resistance. For example, if the coefficient of thermal conductivity of the rigid plastic foam is 0.11 B.t.u./hr./sq. ft./° F. and that of the flexible foam plastic 0.18, then the rigid plastic foam coating having a usual thickness of 0.5 inch will require a flexible foam plastic strip having a thickness $$\frac{0.18}{0.11} \times 0.5 = 0.82 \text{ inch}$$

A self-tapping screw 48 is applied through the two lateral crests 29b, 29a and into the rigid plastic foam coating 50. The screw 48 serves as a crest fastener by drawing the lateral crests 29b, 29a into surface abutting engagement and forms a bond between the lip of the convex marginal web 32 and the lateral sloping web 31a and also a bond between the lip of the concave marginal web 33 and the lateral sloping web 31b.

A typical side-by-side joint of the corrugated building sheet of FIGURE 4 is shown in FIGURE 10 making use of corresponding numerals for corresponding elements. The corrugated building sheet of FIGURES 4 and 10 has the same number of crests 23 as valleys 24 and, accordingly, the side-by-side joint includes one crest, one valley, and one sloping web surface of each of the two abutting sheets in surface-to-surface engagement.

As shown in FIGURE 10, the right-hand sheet 22b overlaps the left-hand sheet 22a. The right-hand sheet 22b is provided with a rigid foam coating having a first thickened lateral bead 51 and having adhered along a surface 54 a strip 53 of flexible foam plastic material. The strip 53 is located below the adjoining lengthwise portion 75 of the sloping web 25b which is next to the extreme full sloping web 25b' of the sheet 22b. The uncovered marginal portion of the overlapping building sheet 22b includes a fragmentary terminal sloping web 26b, the lateral crest 23b, the last full sloping web 25b', the last full valley 24b and at least a portion of the next to last sloping web 25b. Specifically as shown in FIGURE 10, the uncoated marginal portion includes the entire sloping web 25b and a very small portion of the next-to-lateral crest 23. The strip 53 of flexible foam plastic material extends over the central portion of the uncoated unexposed surface of the sloping web 25b.

The overlapped building sheet 22a of FIGURE 10 has a rigid foam coating 50 of essentially uniform thickness over its entire unexposed surface and includes a second thickened bead 52 along its marginal edge beneath the terminal fragmentary sloping web 26a. The exposed surface of the building sheet 22a is in part overlapped by the unexposed surface of the marginal strip of the building sheet 22b.

The corrugated building sheets of FIGURE 6 with a rigid plastic foam coating on the unexposed surface thereof are assembled in side-by-side overlapping relation in the cross-section view in FIGURE 11. Again corresponding numerals are employed to identify corresponding elements.

The left-hand building sheet 35a is the overlapped sheet and the right-hand building sheet 35b is the overlapping building sheet. The rigid plastic foam coating 50 substantially covers the unexposed surface of the building sheet 35b and terminates in a first increased thickness bead 51 which is presented along the sloping arcuate surface 37b. A strip 53 of flexible foam plastic is adhered to the outer surface 54 and overlies the adjoining lengthwise portion 75.

Likewise the building sheet 35a has a second increased thickness bead 52 which coterminates with the marginal lip 38. The overlapped building sheet 35a abuts a girt or purlin 11 of the building skeleton structure. A screw 60 is driven through the flat surfaces 36b, 36a respectively and into the girt 11. The strip 53 of flexible foam plastic material is pressed between the two marginal beads 52, 51 of the two building sheets 35a, 35b. Typically the thickness of the marginal bead 51 along the surface 54 is about 1.125 inch and the thickness of the marginal bead 52 along the side surface is about 0.875 inch where the rigid plastic foam coating 50 has a usual thickness of 0.5 inch.

The top-to-bottom assembly of two corrugated building sheets in accordance with this invention is illustrated in FIGURES 12 and 13. As shown in FIGURE 12 a bottom sheet 28" is applied to a building skeleton in outboard relation, in engagement with a purlin or girt 11 of the building structure. The corrugated metal building sheet 28" has a rigid foam coating 50" of essentially uniform thickness extending entirely to its top edge which is identified by the numeral 69. The coating of rigid plastic foam 50" terminates in essentially normal surface 70 along the plane which contains the upper edge 69.

An upper overlying corrugated metal sheet 28' has a bottom edge 71 and is essentially entirely covered with a uniform thickness coating of rigid plastic foam 50' which terminates along an essentially normal plane 72. It will be observed that the distance between the plane 72 and the bottom edge 71 of the building sheet 28' constitutes an uncovered, unexposed surface of the building sheet 28' which is identified by the numeral 73 in FIGURES 12 and 13. Screws 68 pass through the valley portions 30' and 30" of the two building sheets and structurally support the two sheets with respect to each other and with respect to the building framework, specifically the purlin or girt 11. A crest fastener 74 extends through one or more of the crests 29', 29" of the overlapping building sheets. Customarily the crest fasteners 74 are self-tapping metal screws. Crest fasteners are described in the discussion of FIGURE 9 herein.

It will be observed that the rigid foam coating 50' has its bottom normal surface 72 in abutment with the upper normal surface 70 of the rigid foam coating 50". The unexposed surface 73 which extends along the entire bottom portion of the upper corrugated metal sheet 28' is in surface-to-surface engagement with the exposed outer surface of the lower corrugated building sheets 28".

FIGURE 13 illustrates a typical corner appearance of the present corrugated metal building sheets having an uncoated lateral margin 49 and an uncoated end margin 73. The corrugated metal building sheet of FIGURE 13 corresponds in profile to the sheet 28 which is shown in FIGURE 5. It will be observed that the corrugated building sheet of FIGURE 13 will readily accommodate interlocking sheet-to-sheet assemblies of the type illustrated in FIGURES 1, 2 and 3.

The top-to-bottom overlapping arrangement as shown in FIGURE 12 remains of significance for extremely high rise building walls and roof assemblies. The recent availability of corrugated metal building sheets in long lengths, for example, up to 40 feet, has permitted the installation of building side walls and roofs with fewer requirements for end-to-end lapping of the corrugated metal building sheets. However it is frequently desirable that the corrugated metal building sheets be overlapped end-to-end despite the availability of long lengths for the reason that thermal expansion and contraction of the sheets in extremely long lengths imposes severe stresses on the fastening means which are employed to secure these corrugated building sheets to the skeleton of the building.

It should further be observed that the top-to-bottom and side-by-side joints which are obtained with the present corrugated metal building products provide a continuous thermal insulating barrier for the resulting building and also provide a requisite vapor barrier without the independent installation of such materials as required by existing practices.

The rigid, foamed-in-place plastic material which comprises the coating over the unexposed surface of the present corrugated metal building sheets is preferably rigid polyurethane foam which is formed by polyaddition reactions between a polyol ingredient and a polyisocyanate ingredient in the presence of suitable foaming agents which may comprise water, but which preferably comprise halogenated hydrocarbons such as halogenated fluorocarbons of the methane or ethane series. Preferably for the present purposes the rigid plastic foam material is possessed of fire retardant properties, i.e., the foam forming ingredients will produce a rigid plastic foam which resists combustion.

A preferred polyol material is at least trifunctional and has hydroxyl numbers of at least 250, more particularly from about 250 to about 1850 and particularly from 250 to 700. A preferred class of rigid forming polyols for use in the compositions of this invention are those polyethers formed by reacting alkylene oxides comprising two to four carbon atoms with polyhydric alcohols comprising, for example, 3 to 8 reactable hydroxyl groups. Examples of polyhydric alcohol useful in preparing the polyethers are. glycerine, 1,2,6-hexene triol, pentaerythritol, pentoses, sorbitol, glucose, sucrose, fructose, etc. Ortho-phosphoric acid also is a useful polyhydroxy material which may be reacted with alkylene oxides to produce fire-retardant polyether polyols.

The flexible foam plastic strips which are provided in the present invention are preferably obtained from flexible polyurethane foam compositions. These flexible polyurethane foams are customarily contained by reacting diols or high molecular weight triols with diisocyanate materials. Suitable polyols for the formation of flexible polyurethane foams include the diols, and high molecular weight triols, having molecular weights between about 675 and 5,000. Usually the molecular weight of the diols may be selected over a wide range, e.g., about 62 to 2000. Especially useful results have been obtained using diols selected from the group consisting of alkylene glycols and polyoxyalkylene glycols. Examples of such materials are: ethylene glycol; propylene glycol; butylene glycol-1,3; 2-methylene pentane diol- 2,4; 2-ethyl hexane diol-1,3; hexamethylene glycol; decamethylene glycol; diethylene glycol; triethylene glycol; tetraethylene glycol; polyethylene glycols having molecular weights of about 200, 400 and 600; dipropylene glycol; tripropylene glycol; polypropylene glycols having molecular weights of about 400, 425, 750, 1200 and 2000, etc.

The actual composition of the flexible foam plastic strip and the rigid plastic foam coating for the present insulated corrugated metal building sheets forms no part of the present invention. The foregoing description is concluded by way of explanation.

I claim:

1. A corrugated building sheet formed from an essentially rectangular metal sheet having a plurality of generally parallel grooves or troughs forming corrugations and having spaced surfaces aligned in a common plane to admit fastening of the said building sheet to a flat surface, an overlapping margin along a first side edge and an overlapped margin along a second side edge of said building sheet, whereby two such building sheets may be assembled in side-by-side relation with the said overlapping margin of one building sheet being in surface-to-surface engagement with the said overlapped margin of the other building sheet, said building sheet having a rigid plastic foam coating adhered to the entire unexposed surface thereof except for the said overlapping margin and an adjoining lengthwise portion of said unexposed surface, the said rigid plastic foam coating having a substantially constant usual thickness over its entire area except for a first lengthwise bead contiguous with said adjoining lengthwise portion and a second lengthwise bead at said second side edge, the thickness of said lengthwise beads being greater than said substantially constant usual thickness, a lengthwise strip of flexible foam plastic material secured to said building sheet and positioned along the length of said first lengthwise bead and overlying said adjoining lengthwise portion of said unexposed surface, said strip having a normally uncompressed width which is greater than the width of said adjoining lengthwise portion, said strip having a thickness which is greater than the said substantially constant usual thickness of the said rigid plastic foam coating whereby the said flexible foam plastic strip has approximately the same thermal resistance as the said rigid plastic foam coating in its said substantially constant usual thickness and whereby the said increased thickness of the said rigid plastic foam coating along the said overlapping margin is approximately the thickness of the said flexible foam plastic strip, whereby when two said sheets are assembled in side-by-side relation, the said rigid plastic foam coating of the overlapped margin of one sheet compresses the said flexible foam plastic strip of the overlapping margin of the other sheet to permit assembly of the two sheets with the confronting surfaces of the said two margins being in surface-to-surface engagement and the said sheets presenting overall a low coefficient of thermal conductivity corresponding to that developed by the said rigid plastic foam coating in its said substantially constant usual thickness.

2. The corrugated building sheet of claim 1 wherein the said rigid plastic foam is polyurethane foam.

3. The corrugated building sheet of claim 1 wherein the said flexible foam plastic strip is fabricated from flexible polyurethane foam.

4. The corrugated building sheet of claim 1 having an overlapping end portion along one corrugated end portion and having an overlapped end portion along the opposite corrugated end, wherein the unexposed surface of the said overlapping end portion is not coated with the said rigid plastic foam material, thereby to allow the said overlapping end portion to engage the said overlapped end portion of an adjacent one of said sheets in surface-to-surface engagement, with the rigid plastic foam coating of the two sheets being in end-to-end abutment.

5. A corrugated building sheet formed from an essentially rectangular metal sheet and having a cross-sectional profile including alternating co-planar crests and, interposed therebetween, co-planar valleys with sloping webs connecting the said crests to the said valleys, the number of crests being one greater than the number of valleys whereby the said sheet has lateral crests along both sides connected to fragmentary sloping webs depending outwardly from the said lateral crests, said building sheet having an overlapping margin along a first side edge thereof and an overlapped margin along a second side edge thereof, said overlapping margin and said overlapped margin each comprising one fragmentary sloping web, the adjoining lateral crest, and a portion of the adjoining sloping web, said building sheet having a rigid plastic foam coating adhered to the entire unexposed surface thereof except for said overlapping margin and an adjoining lengthwise portion of said adjoining sloping web, said rigid plastic foam coating having a substantially constant usual thickness over its entire area except for a lengthwise bead contiguous with the said adjoining lengthwise portion, said lengthwise bead having a thickness which is greater than the said substantially constant usual thickness of said rigid plastic foam coating, a lengthwise strip of flexible foam plastic material secured to said building sheet and overlying said adjoining lengthwise portion of said unexposed surface and abutting the sidewall of the increased thickness rigid plastic foam lengthwise bead, said strip having a normally uncompressed width which is greater than the width of said adjoining lengthwise portion, said strip having a thickness which is greater than the said substantially constant usual thickness of the said rigid plastic foam coating and approximately equal in thickness to the said increased thickness of the said rigid plastic foam lengthwise bead, whereby when two said building sheets are assembled in side-by-side relation, the said lateral crest of the overlapping margin is presented in surface-to-surface engagement with the opposite lateral crest of the adjoining one of said sheets, and one of said fragmentary sloping webs of each sheet being in engagement with one of said lateral sloping webs of the adjoining sheet, and with the said flexible foam plastic strip being maintained in compression between the said rigid plastic foam coatings of the two said building sheets.

6. A corrugated building sheet formed from an essentially rectangular metal sheet and having a cross-sectional profile including alternating co-planar crests and, interposed therebetween, co-planar valleys with sloping webs connecting the said crests to the said valleys, the number of crests being equal to the number of valleys whereby the said sheet has a lateral crest along one side and a lateral valley along the other side, each said lateral crest and lateral valley being connected to a fragmentary sloping web extending outwardly from the said lateral crest and the said lateral valley respectively, said building sheet having (a) an overlapping margin along a first side edge thereof comprising said lateral crest and the adjoining fragmentary sloping web, the inwardly adjoining sloping web, the next adjoining valley and at least a portion of the next adjoining sloping web and (b) an overlapped margin comprising said lateral valley and the adjoining fragmentary sloping web, the inwardly adjoining sloping web, the next adjoining crest and at least a portion of the next adjoining sloping web, said building sheet having a rigid plastic foam coating adhered to the entire unexposed surface thereof except for said overlapping margin an adjoining lengthwise portion of said next adjoining sloping web, said rigid plastic foam coating having a substantially constant usual thickness over its entire area except for a first thickened lengthwise bead contiguous with the said adjoining lengthwise portion and a second thickened lengthwise bead contiguous with the opposite said fragmentary sloping web where the said rigid plastic foam coating has increased thickness, a lengthwise strip of flexible foam plastic material secured to said building sheet and overlying said adjoining lengthwise portion of said unexposed surface and abutting the side wall of the said first thickened lengthwise bead, said strip having a width which is greater than the width of said adjoining lengthwise portion, said strip having a thickness which is greater than the said usual thickness of the said rigid plastic foam coating and approximately equal in thickness to the increased thickness of the said lengthwise beads, whereby when two said building sheets are assembled in side-by-side relation, the said lateral crest and said next adjoining valley of one sheet overlap the lateral valley and next adjoining crest of the overlapped sheet in surface-to-surface engagement with one of the said fragmentary sloping webs of each sheet being in engagement with the said next adjoining sloping webs of each sheet, and with the said flexible foam plastic strip being maintained in compression between the said first thickened lengthwise bead of one sheet and the said second thickened lengthwise bead of the other sheet.

References Cited

UNITED STATES PATENTS

| | | |
|---|---|---|
| 2,073,334 | 3/1937 | Coffman. |
| 3,141,206 | 7/1964 | Stephens _____ 52—403 X |
| 3,150,465 | 9/1964 | Johnson _____ 52—537 |
| 3,290,845 | 12/1966 | Snyder _____ 52—394 X |

FOREIGN PATENTS

| | | |
|---|---|---|
| 1,166,799 | 6/1958 | France. |
| 341,295 | 11/1959 | Switzerland. |

HENRY C. SUTHERLAND, *Primary Examiner.*

ALFRED C. PERHAM, *Assistant Examiner.*